US008483944B2

(12) United States Patent
Tsunekawa

(10) Patent No.: US 8,483,944 B2
(45) Date of Patent: Jul. 9, 2013

(54) COLLISION DETERMINATION DEVICE

(75) Inventor: Jun Tsunekawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/139,595

(22) PCT Filed: Dec. 24, 2008

(86) PCT No.: PCT/JP2008/003927

§ 371 (c)(1),
(2), (4) Date: Jun. 14, 2011

(87) PCT Pub. No.: WO2010/073297

PCT Pub. Date: Jul. 1, 2010

(65) Prior Publication Data

US 2011/0246071 A1 Oct. 6, 2011

(51) Int. Cl.

| | |
|---|---|
| ***G08G 1/16*** | (2006.01) |
| ***B60W 30/08*** | (2012.01) |
| ***B60R 21/013*** | (2006.01) |
| *G06F 17/00* | (2006.01) |
| *B60R 21/0132* | (2006.01) |

(52) U.S. Cl.
USPC .............................. 701/301; 701/45; 701/300

(58) Field of Classification Search
USPC .................... 340/903; 342/29–32, 41, 70–71, 342/455; 700/255; 701/300–302
See application file for complete search history.

(56) References Cited

U.S. PATENT DOCUMENTS

| | | | | |
|---|---|---|---|---|
| 5,388,048 | A * | 2/1995 | Yavnayi et al. | 701/301 |
| 5,754,099 | A | 5/1998 | Nishimura et al. | |
| 6,393,361 | B1 | 5/2002 | Yano et al. | |
| 6,571,176 | B1 * | 5/2003 | Shinmura et al. | 701/301 |
| 6,794,987 | B2 * | 9/2004 | Schiffmann et al. | 340/435 |
| 2003/0139883 | A1 * | 7/2003 | Takafuji et al. | 701/301 |
| 2003/0154011 | A1 * | 8/2003 | Rao et al. | 701/45 |
| 2004/0107033 | A1 * | 6/2004 | Rao et al. | 701/45 |
| 2005/0203705 | A1 * | 9/2005 | Izumi et al. | 701/301 |

(Continued)

FOREIGN PATENT DOCUMENTS

| | | |
|---|---|---|
| JP | 7 262499 | 10/1995 |
| JP | 9 91598 | 4/1997 |
| JP | 10 172098 | 6/1998 |
| JP | 2000 326757 | 11/2000 |
| JP | 2004 78333 | 3/2004 |
| JP | 2004 136785 | 5/2004 |

(Continued)

OTHER PUBLICATIONS

International Search Report Issued Jan. 27, 2009 in PCT/JP08/003927 filed Dec. 24, 2008.

*Primary Examiner* — Khoi Tran
*Assistant Examiner* — Dale Moyer
(74) *Attorney, Agent, or Firm* — Oblon, Spivak, McClelland, Maier & Neustadt, L.L.P.

(57) ABSTRACT

A collision determination ECU includes: a possibility determination section for determining whether or not there is a possibility of a collision with a forward vehicle; a traveling direction determination section for determining whether or not changing of a traveling direction of at least one of an own-vehicle and the forward vehicle is in progress; and a condition changing section for changing a collision determination condition, which is a condition for a possibility estimation section to determine that there is a possibility of a collision, so as to be strict, when the traveling direction determination section determines that changing of a traveling direction is in progress. As a result, unnecessary operations of a passenger protection device and the like can be suppressed.

10 Claims, 12 Drawing Sheets

U.S. PATENT DOCUMENTS

| | | | | |
|---|---|---|---|---|
| 2006/0155469 | A1* | 7/2006 | Kawasaki | 701/301 |
| 2007/0080968 | A1* | 4/2007 | Kogure et al. | 345/474 |
| 2008/0183419 | A1* | 7/2008 | Cong et al. | 702/155 |
| 2009/0210108 | A1* | 8/2009 | Okubo et al. | 701/22 |
| 2011/0077864 | A1* | 3/2011 | Konijnendijk | 701/301 |
| 2012/0035846 | A1* | 2/2012 | Sakamoto et al. | 701/301 |

FOREIGN PATENT DOCUMENTS

| | | |
|---|---|---|
| JP | 2007 91102 | 4/2007 |
| JP | 2007 137126 | 6/2007 |
| JP | 2007 153203 | 6/2007 |
| JP | 2007 279892 | 10/2007 |

* cited by examiner

COLLISION DETERMINATION DEVICE

TECHNICAL FIELD

The present invention relates to a collision determination device which is, for example, mounted on a vehicle and determines existence or non-existence of the possibility of a collision with another vehicle.

BACKGROUND ART

Conventionally, various devices, methods, and the like, which determine existence or non-existence of the possibility of a collision with another vehicle have been suggested. For example, a collision prediction method described in the following is disclosed (refer to patent literature 1). More specifically, first, relative positions (relative distance, azimuth angle) and relative velocities of the object vehicle and a vehicle of one's own are obtained and stored, a parallel area is set which is parallel to an estimated moving direction of the object vehicle after elapse of a predetermined prediction time and in which the own-vehicle passes through, and an estimated existence region of an object vehicle is obtained based on a relative distance in a width direction from an edge of the object vehicle. Then, it is judged whether or not a prediction position of the object vehicle after the elapsing of the predetermined prediction time is within a predetermined threshold distance range from the own-vehicle (=collision prediction by using a danger range); and if the prediction position is within a threshold distance range, the possibility of a collision with the object vehicle is judged (=collision prediction by using lap possibility) based on a relative positional relationship between the parallel area and the estimated existence region.

[PATENT LITERATURE 1] Japanese Laid-Open Patent Publication No. 2007-279892

DISCLOSURE OF THE INVENTION

Problems to be Solved by the Invention

However, with the collision prediction method disclosed in patent literature 1, a precise judgment may not be conducted for a curved path or the like, since the possibility of a collision is judged based on a lap rate obtained by taking into consideration of a moving direction vector of the object vehicle after the elapsing of a prediction time. More specifically, when traveling directions of the own-vehicle and another vehicle (for example, an oncoming vehicle) are changing in a curved path or the like, the moving direction vector of the oncoming vehicle changes direction depending on the prediction time; therefore, if an improper prediction time is set, a precise lap rate cannot be obtained.

Specifically, in a case as shown in FIG. 13, unnecessary operations of a passenger protection device and the like such as a seat belt, a headrest, and the like may be performed. FIG. 13 is a plain view showing one example of moving direction vectors Q1, Q2 of an own-vehicle VC1 and an oncoming vehicle VC2 in a curved path. As shown in FIG. 13, even though the own-vehicle VC1 and the oncoming vehicle VC2 are in normal states of traveling (=a state of traveling in which it cannot be said that there is a possibility of a collision), with the collision prediction method disclosed in patent literature 1, unnecessary operations of a passenger protection device and the like may be performed since the moving direction vector Q2 of the oncoming vehicle VC2 is facing the own-vehicle VC1.

The present invention has been arrived in view of above described circumstances, and provides a collision determination device capable of suppressing unnecessary operations of a passenger protection device and the like.

Solution to the Problems

In order to achieve the above described objective, the present invention includes the following characteristics. A first aspect of the present invention is a collision determination device which is mounted on a vehicle and determines existence or non-existence of the possibility of a collision with another vehicle, and which includes a possibility determination section, a traveling direction determination section, and a condition changing section. The possibility determination section determines whether or not there is a possibility of a collision with the other vehicle. Additionally, the traveling direction determination section determines whether or not changing of a traveling direction of at least one of an own-vehicle and the other vehicle is in progress. Furthermore, when the traveling direction determination section determines that changing of a traveling direction is in progress, the condition changing section changes a collision determination condition, which is a condition for the possibility estimation section to determine that there is a possibility of a collision, so as to be strict.

Note that, in the present invention, "changing a collision determination condition so as to be strict" means changing "the collision determination condition" such that it will unlikely be determined that there is a possibility of a collision. In other words, "changing a collision determination condition so as to be strict" means narrowing a range (or area, and the like) which is defined by "the collision determination condition" and in which a collision is determined to possibly occur.

A second aspect of the present invention based on the first aspect, includes a trajectory estimating section that estimates a traveling trajectory which is a trajectory to be traveled in the future by a representation point of the other vehicle. Additionally, when the other vehicle having preconfigured vehicle width and vehicle length moves on the traveling trajectory estimated by the trajectory estimating section, the possibility estimation section determines whether or not there is a possibility of a collision with the other vehicle depending on whether or not the other vehicle intersects the own-vehicle.

In a third aspect of the present invention based on the second aspect, the condition changing section changes the collision determination condition so as to be strict, by reducing at least one of a vehicle width and a vehicle length of the other vehicle.

A fourth aspect of the present invention based on the second aspect, includes an object detection section that detects a position of the other vehicle via a radar. Additionally, the representation point of the other vehicle is an acquisition point obtained by having the other vehicle acquired by the radar.

A fifth aspect of the present invention based on the first aspect, includes a radius-of-curvature calculation section that obtains a radius of curvature of a road on which the own-vehicle is positioned. Additionally, the traveling direction determination section determines whether or not changing of a traveling direction of the own-vehicle is in progress, based on the radius of curvature obtained by the radius-of-curvature calculation section.

In a sixth aspect of the present invention based on the fifth aspect, the traveling direction determination section determines that changing of the traveling direction of the own-vehicle is in progress, when the radius of curvature obtained by the radius-of-curvature calculation section is equal to or smaller than a preconfigured threshold radius.

In a seventh aspect of the present invention based on the fifth aspect, the radius-of-curvature calculation section obtains the radius of curvature by dividing a vehicle speed with a yaw rate.

An eighth aspect of the present invention based on the first aspect, includes a radius-of-curvature calculation section which obtains a radius of curvature of a road on which the own-vehicle is positioned. Additionally, the condition changing section changes the collision determination condition, based on the radius of curvature obtained by the radius-of-curvature calculation section.

In a ninth aspect of the present invention based on the eighth aspect, the radius-of-curvature calculation section obtains the radius of curvature by dividing a vehicle speed with a yaw rate.

A tenth aspect of the present invention based on the second aspect, includes a radius-of-curvature calculation section which obtains a radius of curvature of a road on which the own-vehicle is positioned. Additionally, the condition changing section changes the collision determination condition by changing at least one of a vehicle width and a vehicle length of the other vehicle, based on the radius of curvature obtained by the radius-of-curvature calculation section.

In an eleventh aspect of the present invention based on the tenth aspect, the condition changing section changes the collision determination condition by changing the vehicle length of the other vehicle in a manner approximately proportional to the radius of curvature obtained by the radius-of-curvature calculation section.

In a twelfth aspect of the present invention based on the first aspect, the traveling direction determination section determines whether or not changing of a traveling direction of the other vehicle is in progress, based on a past traveling trajectory of the other vehicle.

Advantageous Effects of the Invention

In the first aspect, the possibility determination section determines whether or not there is a possibility of a collision with another vehicle. Additionally, it is determined whether or not changing of a traveling direction of at least one of an own-vehicle and the other vehicle is in progress. Furthermore, when it is determined that changing of a traveling direction is in progress, a collision determination condition, which is a condition for the possibility estimation section to determine that there is a possibility of a collision, is changed so as to be strict. Therefore, unnecessary operations of a passenger protection device and the like can be suppressed.

More specifically, when it is determined that changing of a traveling direction of at least one of the own-vehicle and the other vehicle is in progress, it is estimated that at least one of the own-vehicle and the other vehicle is traveling in a curved path. Thus, in such a case, as described above by using FIG. 13, unnecessary operations of a passenger protection device and the like may be performed. However, since the collision determination condition, which is a condition for determining that there is a possibility of a collision, is changed so as to be strict, unnecessary operations of a passenger protection device and the like can be suppressed.

In the second aspect, a traveling trajectory, which is a trajectory to be traveled in the future by a representation point of the other vehicle, is estimated. Additionally, when the other vehicle having preconfigured vehicle width and vehicle length moves on the estimated traveling trajectory, since it is determined whether or not there is a possibility of a collision with the other vehicle depending on whether or not the own-vehicle intersects the other vehicle, it can be precisely determined whether or not there is a possibility of a collision.

In the third aspect, since the collision determination condition is changed so as to be strict by reducing at least one of a vehicle width and a vehicle length of the other vehicle, the collision determination condition can be changed properly so as to be strict with a simple method.

In the fourth aspect, a position of the other vehicle is detected via a radar. Additionally, since the representation point of the other vehicle is an acquisition point obtained by having the other vehicle acquired by the radar, the representation point of the other vehicle can be properly configured.

More specifically, since the representation point of the other vehicle is an acquisition point obtained by having the other vehicle acquired by the radar, a traveling trajectory which is a trajectory to be traveled in the future by the other vehicle can be easily estimated, based on a detection result (relative position, relative velocity) from the radar regarding the other vehicle for past acquisition points.

In the fifth aspect, a radius of curvature of a road on which the own-vehicle is positioned is obtained. Additionally, since it is determined whether or not changing of a traveling direction of the own-vehicle is in progress based on the obtained radius of curvature, it can be properly determined whether or not changing of the traveling direction of the own-vehicle is in progress.

In the sixth aspect, since it is determined that changing of the traveling direction of the own-vehicle is in progress when the obtained radius of curvature is equal to or smaller than a preconfigured threshold radius, it can be easily determined whether or not changing of the traveling direction of the own-vehicle is in progress.

In the seventh aspect, since the radius of curvature is obtained by dividing a vehicle speed with a yaw rate, the radius of curvature can be obtained easily.

In the eighth aspect, a radius of curvature of a road on which the own-vehicle is positioned is obtained. Additionally, since the collision determination condition is changed based on the obtained radius of curvature, the collision determination condition can be changed properly.

More specifically, in a state where the other vehicle is approaching the own-vehicle, the smaller the radius of curvature of the road is, a moving direction vector of the other vehicle will face the own-vehicle and unnecessary operations of a passenger protection device and the like are highly more likely to be performed. Hence, since the collision determination condition is changed based on the obtained radius of curvature (for example, the collision determination condition is changed so as to be more strict when the radius of curvature is smaller); the collision determination condition can be changed properly.

In the ninth aspect, since the radius of curvature is obtained by dividing a vehicle speed with a yaw rate, the radius of curvature can be obtained easily.

In the tenth aspect, a radius of curvature of a road on which the own-vehicle is positioned is obtained. Additionally, the collision determination condition is changed by changing at least one of a vehicle width and a vehicle length of the other vehicle, based on the obtained radius of curvature. Therefore, with a simple method, the collision determination condition can be changed properly so as to be strict.

In the eleventh aspect, the collision determination condition is changed by changing the vehicle length of the other vehicle in a manner approximately proportional to the obtained radius of curvature. Therefore, with a further simple method, the collision determination condition can be properly changed so as to be strict.

In the twelfth aspect, since it is determined whether or not changing of a traveling direction of the other vehicle is in progress based on a past traveling trajectory of the other vehicle, it can be properly determined whether or not changing of the traveling direction of the other vehicle is in progress.

DESCRIPTION OF THE REFERENCE CHARACTERS

Figure 1:
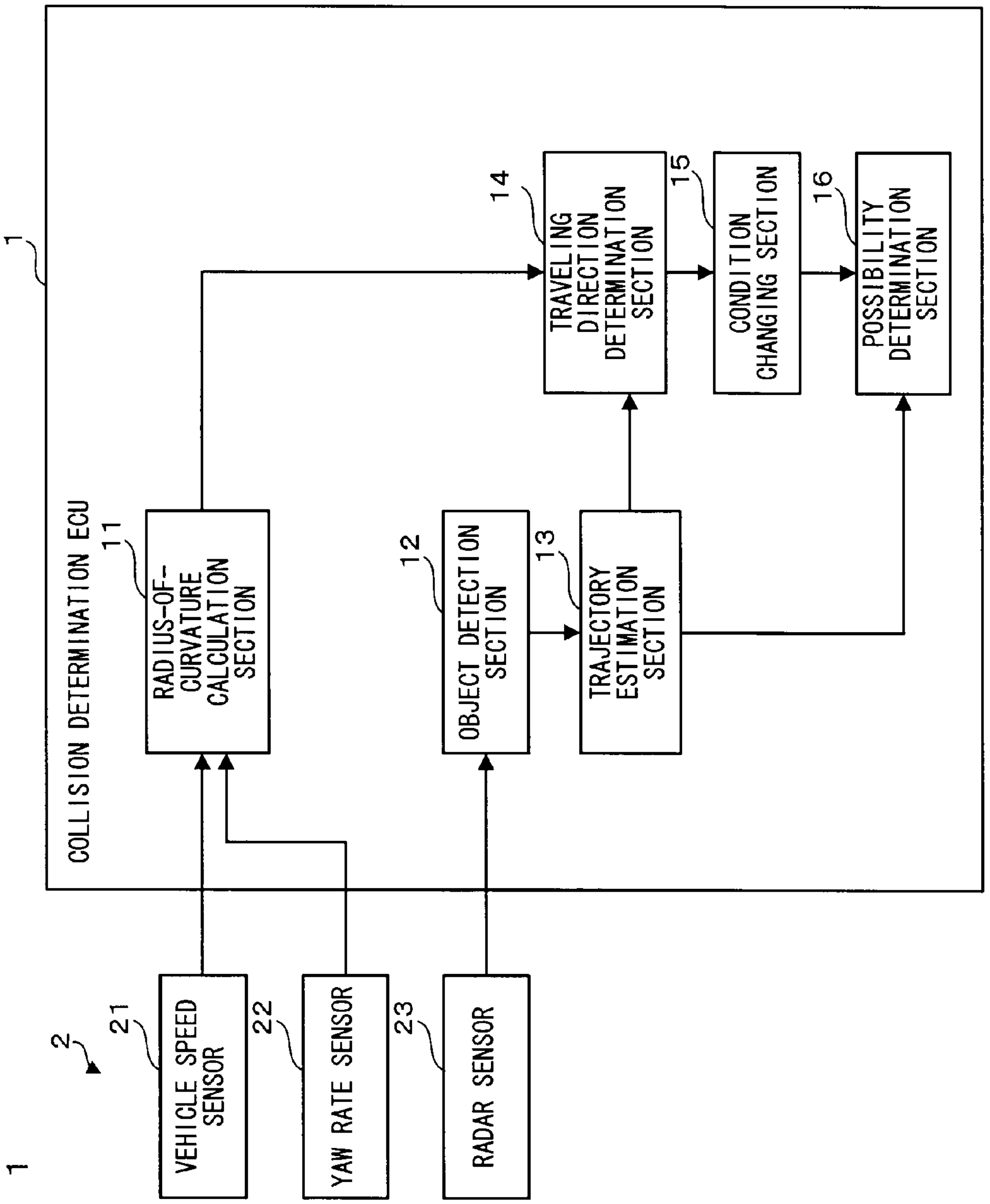
FIG. 1 is a block diagram showing one example of a configuration of a collision determination device according to the present invention.

1 collision determination ECU
11 radius-of-curvature calculation section
12 object detection section
13 trajectory estimation section
14 traveling direction determination section
15 condition changing section
16 possibility determination section
2 input instrument
21 vehicle speed sensor
22 yaw rate sensor
23 (23R, 23L) radar sensor

BEST MODE FOR CARRYING OUT THE INVENTION

In the following, an embodiment of a collision determination device according to the present invention will be described in reference to drawings. FIG. 1 is a block diagram showing one example of a configuration of a collision determination device according to the present invention. As shown in FIG. 1, a collision determination ECU (Electronic Control Unit) 1 (=corresponding to the collision determination device) according to the present invention is connected in a manner capable of communicating with an input instrument 2 which is a peripheral instrument.

First, referring to FIG. 1, the input instrument 2 of the collision determination ECU 1 will be described. The input instrument 2 includes a vehicle speed sensor 21, a yaw rate sensor 22, and a radar sensor 23. The vehicle speed sensor 21 is a sensor that detects a vehicle speed, and outputs, to the collision determination ECU 1 (here, a radius-of-curvature calculation section 11), a signal indicating a vehicle speed.

The yaw rate sensor 22 consists of a rate gyro or the like, and is a sensor that detects a yaw rate indicating a rate of change of yaw angle (=a rotational angular velocity about a vertical axis that passes through a center-of-gravity point of a vehicle), and outputs a signal indicating a yaw rate to the collision determination ECU 1 (here, the radius-of-curvature calculation section 11).

The radar sensor 23 is, for example, a sensor that detects a relative position and a relative velocity of a forward vehicle VC2 (refer to FIG. 3) via a millimeter wave radar or the like, and outputs a signal indicating the relative position and the relative velocity to the collision determination ECU 1 (here, an object detection section 12).

Figure 2:
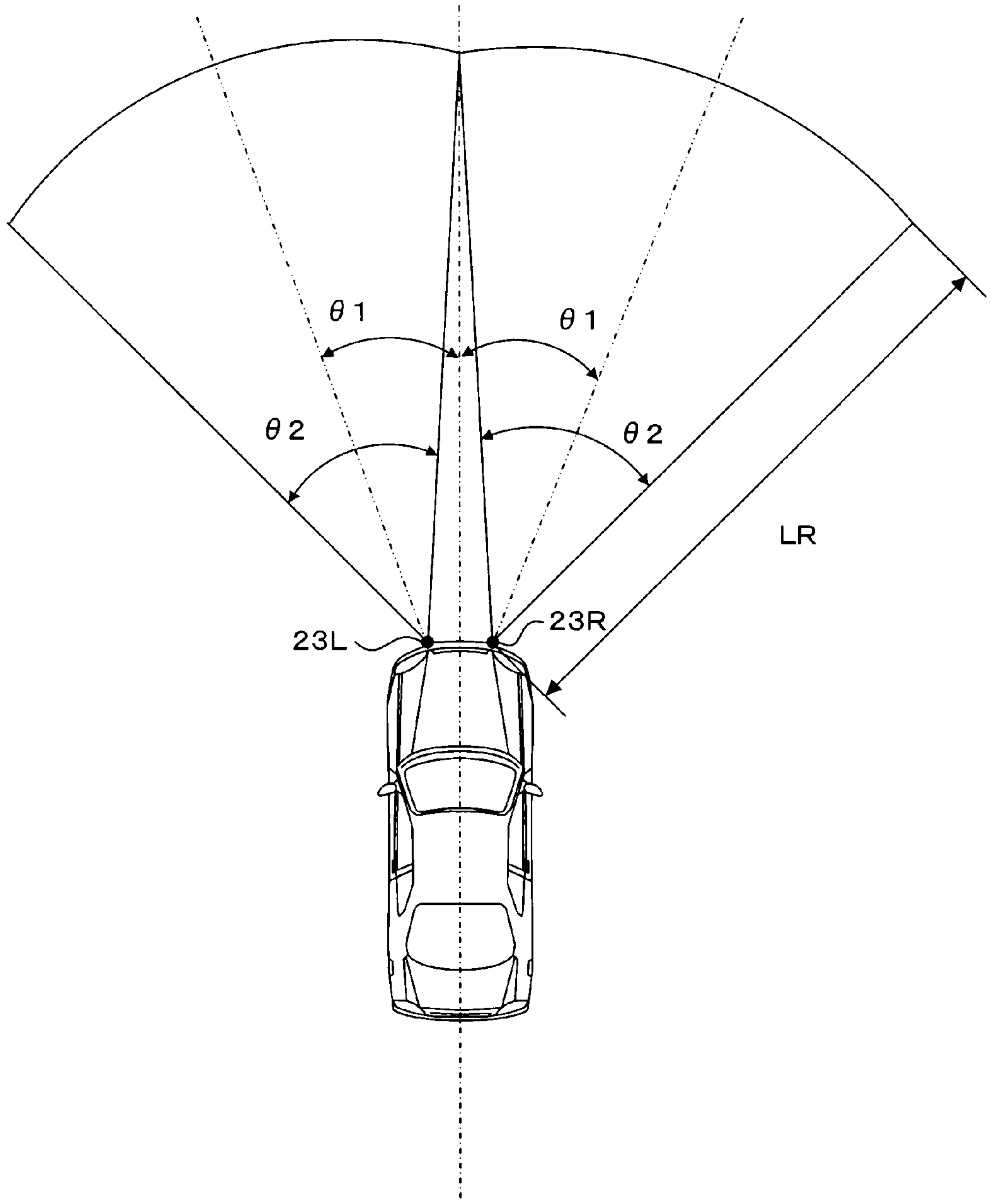
FIG. 2 is a plain view showing one example of a detection range of a radar sensor.

FIG. 2 is a plain view showing one example of a detection range of the radar sensor 23. Two radar sensors 23 (23R, 23L) are mounted on the front end portion of the vehicle in the vehicle width direction. Each of the radar sensors 23R, 23L is configured so as to be able to detect an area (sector-like shaped area in the figure) defined as having a detectable distance LR (for example, 30 m) as a distance from each of the radar sensors 23R, 23L, and being within a range in a preconfigured spread angle $\theta$2 (for example, 45°) that has a direction inclined, from the center line (a chain line in the figure) of the front to rear direction of the vehicle, to the right side (or left side) by a predetermined angle $\theta$1 configured in advance (for example, 25°), as a center (a two-dot chain line in the figure).

In the present embodiment, although a case where two radar sensors 23 are mounted on the vehicle is described, a configuration may be used in which only one radar sensor 23 is mounted, or a configuration may be used in which three of more of the radar sensors 23 are mounted. In addition, in the present embodiment, although a case where the radar sensors 23 detects the relative position and the relative velocity of the forward vehicle VC2 is described, a configuration may be used in which the radar sensors 23 detect a rear vehicle or a lateral vehicle.

Next, by using FIG. 1, a functional configuration of the collision determination ECU 1 will be described. Functionally, the collision determination ECU 1 includes the radius-of-curvature calculation section 11, the object detection section 12, a trajectory estimation section 13, a traveling direction determination section 14, a condition changing section 15, and a possibility determination section 16.

Note that, the collision determination ECU 1 causes a microcomputer (equivalent to a computer), which is allocated at a proper place in the collision determination ECU 1, to execute a control program stored in advance on a ROM (Read Only Memory) or the like allocated at a proper place in the collision determination ECU 1, and thereby functionally causes the microcomputer to function as functional sections such as the radius-of-curvature calculation section 11, the object detection section 12, the trajectory estimation section

13, the traveling direction determination section 14, the condition changing section 15, and the possibility determination section 16.

The radius-of-curvature calculation section 11 is a functional section that obtains a radius of curvature R1 of a road on which an own-vehicle VC1 is positioned. Specifically, the radius-of-curvature calculation section 11 obtains the radius of curvature R1 by applying, to the following formula (1), a vehicle speed V from the vehicle speed sensor 21 and a yaw rate a from the yaw rate sensor 22.

$$(\text{radius of curvature } R1)=(\text{vehicle speed } V)/(\text{yaw rate } \alpha) \quad (1)$$

More specifically, the radius-of-curvature calculation section 11 obtains the radius of curvature R1 by dividing the vehicle speed V with the yaw rate α.

As described above, since the radius of curvature R1 is obtained by dividing the vehicle speed V with the yaw rate α, the radius of curvature R1 can be obtained easily.

In the present embodiment, although described is a case where the radius-of-curvature calculation section 11 obtains the radius of curvature R1 based on the vehicle speed V and the yaw rate α, another configuration may be used in which the radius-of-curvature calculation section 11 obtains the radius of curvature R1 with another method. For example, a configuration in which the radius-of-curvature calculation section 11 obtains the radius of curvature R1 based on a steering angle detected by a steering sensor or the like can be used. In such a case, the radius of curvature R1 can be obtained easily. Additionally, for example, a configuration may be used in which the radius-of-curvature calculation section 11 obtains the radius of curvature R1 based on a center line detected by a camera and the like. In such a case, the radius of curvature R1 can be obtained precisely. Furthermore, for example, a configuration may be used in which the radius-of-curvature calculation section 11 obtains the radius of curvature R1 based on map information from a navigation system or the like. In such a case, the radius of curvature R1 can be obtained extremely easily.

The object detection section 12 is a functional section that detects the relative position and the relative velocity of the forward vehicle VC2 (corresponding to the other vehicle; refer to FIG. 3) via the radar sensors 23. As described here, since the relative position and the relative velocity of the forward vehicle VC2 are detected via the radar sensors 23, precise relative position and relative velocity of the forward vehicle VC2 can be detected with a simple configuration.

In the present embodiment, although described is a case where the object detection section 12 detects the relative position and the relative velocity of the forward vehicle VC2 via the radar sensors 23, a configuration may be used in which the object detection section 12 detects the relative position and the relative velocity of the forward vehicle VC2 via other sensors. For example, a configuration may be used in which the object detection section 12 detects the relative position and the relative velocity of the forward vehicle VC2 via an imaging sensor such as a CCD (Charge Coupled Device) sensor or the like. In such a case, in addition to the relative position and the relative velocity of the forward vehicle VC2, the size of the forward vehicle VC2 can be detected.

The trajectory estimation section 13 is a functional section that estimates a traveling trajectory which is a trajectory to be traveled in the future by a representation point (here, an acquisition point of the radar sensors 23) of the forward vehicle VC2. Specifically, the trajectory estimation section 13 estimates the traveling trajectory, which is a trajectory to be traveled in the future and which is the acquisition point of the forward vehicle VC2 from the radar sensors 23, based on the relative position and the relative velocity of the forward vehicle VC2 detected in the past by the object detection section 12 via the radar sensors 23.

Figure 3:
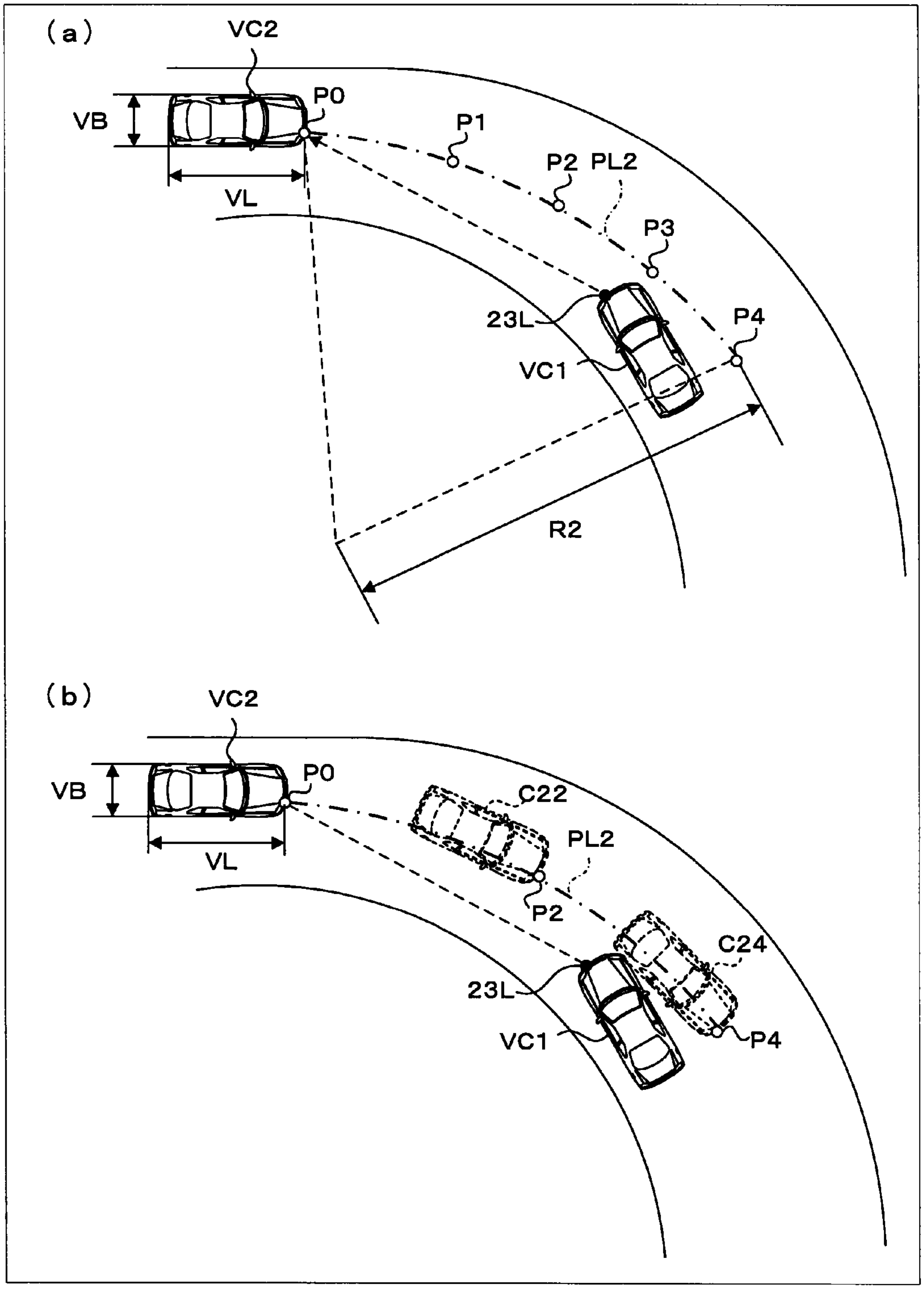
FIG. 3 is a plain view showing one example of a process conducted by a possibility determination section that determines existence or non-existence of a possibility of a collision with a forward vehicle VC2.

FIG. 3(*a*) is a plain view showing one example of a traveling trajectory PL2 estimated by the trajectory estimation section 13. This figure is a plain view showing a state in which the own-vehicle VC1 and the forward vehicle VC2 are traveling in a curved path. The own-vehicle VC1, which located in the lower right of the figure, is traveling in a curved path that bends leftward; and the forward vehicle VC2 is acquired by the radar sensor 23L. The forward vehicle VC2, which is located in the upper left of the figure, is traveling in a curved path that bends rightward. An acquisition point P0 of the forward vehicle VC2 is an acquisition point at the present time. Additionally, the trajectory estimation section 13 estimates that the acquisition point of the forward vehicle VC2 will move along the traveling trajectory PL2 in the future. More specifically, the trajectory estimation section 13 estimates that the acquisition point of the forward vehicle VC2 will move in a sequence of acquisition points P1, P2, P3, and P4, corresponding to elapsing of time ΔT, 2×ΔT, 3×ΔT, 4×ΔT (for example, time ΔT=0.1 second) from the present time. Note that, as a matter of convenience, shown here is a case where the own-vehicle VC1 is traveling at an extremely low speed (or is at a stop) when compared to the forward vehicle VC2.

As described above, since the representation point of the forward vehicle VC2 is the acquisition point obtained by having the forward vehicle VC2 acquired by the radar sensors 23, the representation point of the forward vehicle VC2 can be properly configured. More specifically, since the representation point of the forward vehicle VC2 is the acquisition point obtained by having the forward vehicle VC2 acquired by the radar sensors 23, the trajectory estimation section 13 can easily estimate the traveling trajectory PL2, which is a trajectory to be traveled in the future, based on the detection result (relative position, relative velocity) from the radar sensors 23 regarding the past acquisition points of the forward vehicle VC2.

In the present embodiment, although described is a case where the representation point of the forward vehicle VC2 is the acquisition point obtained by having the forward vehicle VC2 acquired by the radar sensors 23, a configuration in which the representation point of the forward vehicle VC2 is another point may be used. For example, a configuration in which the representation point of the forward vehicle VC2 is the vehicle central point of the forward vehicle VC2 may be used. In such a case, determination of whether a collision will occur or not can be conducted easily, since a position of the forward vehicle VC2 will not change depending on the detection condition of the radar sensors 23 as in the case with the acquisition point.

In addition, here, the traveling trajectory PL2 is estimated by the trajectory estimation section 13 as a circular arc. Then, as described in the following, based on a radius R2 of the circular arc, the traveling direction determination section 14 determines whether or not changing of the traveling direction of the forward vehicle VC2 is in progress, and the condition changing section 15 changes a collision determination condition, which is a condition for determining that there is a possibility of a collision.

Returning to FIG. 1 again, the functional configuration of the collision determination ECU 1 will be described. The traveling direction determination section 14 is a functional section that determines whether or not changing of a traveling direction of at least one of the own-vehicle VC1 and the forward vehicle VC2 is in progress.

Specifically, the traveling direction determination section 14 determines whether or not changing of the traveling direction of the own-vehicle VC1 is in progress, based on the radius of curvature R1 obtained by the radius-of-curvature calculation section 11. More specifically, the traveling direction determination section 14 determines that changing of the traveling direction of the own-vehicle VC1 is in progress when the radius of curvature R1 obtained by the radius-of-curvature calculation section 11 is equal to or smaller than a preconfigured threshold radius R1S (for example, 100 m).

In addition, the traveling direction determination section 14 determines whether or not changing of the traveling direction of the forward vehicle VC2 is in progress, based on a radius of curvature R2 of the traveling trajectory PL2 of the forward vehicle VC2 obtained by the trajectory estimation section 13. More specifically, the traveling direction determination section 14 determines changing of the traveling direction of the forward vehicle VC2 is in progress when the radius of curvature R2 of the traveling trajectory PL2 of the forward vehicle VC2 obtained by the trajectory estimation section 13 is equal to or smaller than a preconfigured threshold radius R2S (for example, 100 m).

As described above, since it is determined whether or not changing of the traveling direction of the own-vehicle VC1 is in progress based on the radius of curvature R1 obtained by the radius-of-curvature calculation section 11 for the road on which the own-vehicle VC1 is positioned, it can be properly determined whether or not changing of the traveling direction of the own-vehicle VC1 is in progress.

Since it is determined that changing of the traveling direction of the own-vehicle VC1 is in progress when the radius of curvature R1 obtained by the radius-of-curvature calculation section 11 is equal to or smaller than the preconfigured threshold radius R1S, it can be easily determined whether or not changing of the traveling direction of the own-vehicle VC1 is in progress.

Furthermore, since it is determined whether or not changing of the traveling direction of the forward vehicle VC2 is in progress based on the radius of curvature R2 of the traveling trajectory PL2 obtained based on a past traveling trajectory of the forward vehicle VC2, it can be properly determined whether or not changing of the traveling direction of the forward vehicle VC2 is in progress.

In the present embodiment, although described is a case where the traveling direction determination section 14 determines whether or not changing of the traveling direction of the own-vehicle VC1 is in progress based on the radius of curvature R1, a configuration may be used in which the traveling direction determination section 14 determines whether or not changing of the traveling direction of the own-vehicle VC1 is in progress with another method. For example, a configuration may be used in which the traveling direction determination section 14 determines whether or not changing of the traveling direction of the own-vehicle VC1 is in progress based on a steering angle detected by a steering sensor or the like. In such a case, it can be further easily determined whether or not changing of the traveling direction of the own-vehicle VC1 is in progress.

Additionally, in the present embodiment, although described is a case where the traveling direction determination section 14 determines that changing of the traveling direction of the own-vehicle VC1 is in progress when the radius of curvature R1 is equal to or smaller than the preconfigured threshold radius R1S (here, 100 m), a configuration may be used in which the threshold radius R1S is increased or decreased depending on the vehicle speed (or the relative velocity with regard to the forward vehicle VC2). For example, a configuration may be used in which the threshold radius R1S is increased more when the vehicle speed (or the relative velocity with regard to the forward vehicle VC2) is higher. In such a case, whether or not changing of the traveling direction of the own-vehicle VC1 is in progress can be further properly determined.

Furthermore, in the present embodiment, although described is a case where the traveling direction determination section 14 determines whether or not changing of the traveling direction of the forward vehicle VC2 is in progress based on the radius of curvature R2 of the traveling trajectory PL2 of the forward vehicle VC2 obtained by the trajectory estimation section 13, a configuration may be used in which the traveling direction determination section 14 determines whether or not changing of the traveling direction of the forward vehicle VC2 is in progress based on the past traveling trajectory of the forward vehicle VC2. For example, a configuration may be used in which a radius of curvature of the past traveling trajectory of the forward vehicle VC2 is obtained; and based on this radius of curvature, the traveling direction determination section 14 determines whether or not changing of the traveling direction of the forward vehicle VC2 is in progress.

The condition changing section 15 is a functional section that changes the collision determination condition, which is a condition for the possibility determination section 16 to determine that there is a possibility of a collision, so as to be strict, when the traveling direction determination section 14 determines that changing of the traveling direction is in progress.

Specifically, the condition changing section 15 changes the collision determination condition, by changing a hypothetical vehicle length VL of the forward vehicle VC2 used by the possibility determination section 16 to determine existence or non-existence of the possibility of a collision, based on the radius of curvature R1 obtained by the radius-of-curvature calculation section 11. More specifically, the condition changing section 15 changes the hypothetical vehicle length VL of the forward vehicle VC2 based on the following formula (2) in a manner proportional to the radius of curvature R1 obtained by the radius-of-curvature calculation section 11.

$$\text{hypothetical vehicle length VL} = \text{standard vehicle length } L20 \times R1/R1S \tag{2}$$

Here, the standard vehicle length L20 is a preconfigured standard hypothetical vehicle length (for example, 4 m).

Furthermore, the condition changing section 15 changes the collision determination condition, which is a condition for determining that there is a possibility of a collision, by changing the hypothetical vehicle length VL of the forward vehicle VC2 used by the possibility determination section 16 to determine existence or non-existence of the possibility of a collision, based on the radius of curvature R2 of the traveling trajectory PL2 of the forward vehicle VC2 obtained by the trajectory estimation section 13. More specifically, the condition changing section 15 changes the hypothetical vehicle length VL of the forward vehicle VC2 based on the following formula (3) in a manner proportional to the radius of curvature R2 of the traveling trajectory PL2 of the forward vehicle VC2 obtained by the trajectory estimation section 13.

$$\text{hypothetical vehicle length VL} = \text{standard vehicle length } L20 \times R2/R2S \tag{3}$$

Here, the standard vehicle length L20 is a preconfigured standard hypothetical vehicle length (for example, 4 m).

Figure 5:
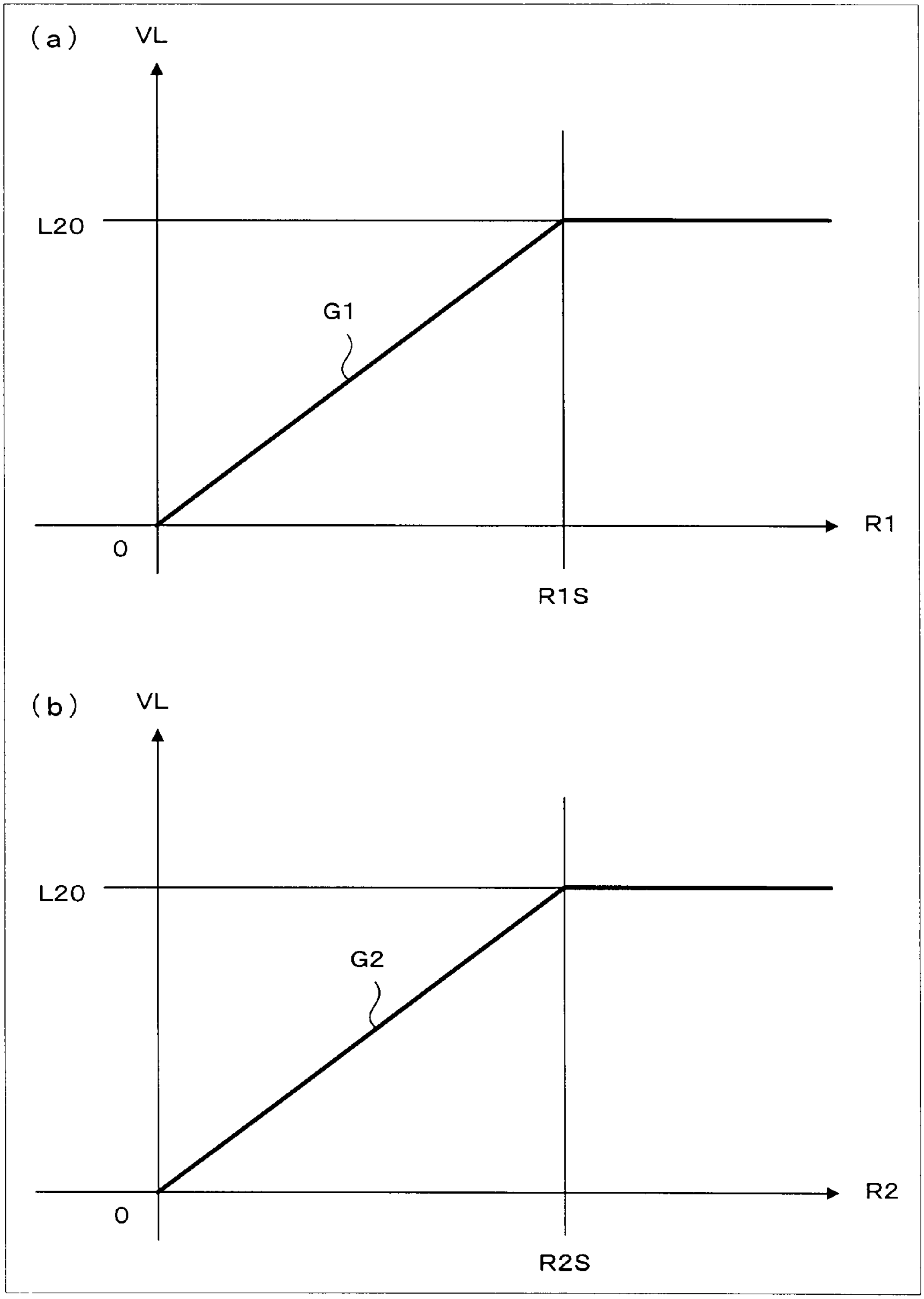
FIG. 5 shows graphs of one example of the relationships between the hypothetical vehicle length VL and radius of curvatures R1, R2.

FIG. 5 shows graphs of one example of the relationships between the hypothetical vehicle length VL and the radius of curvatures R1, R2. In FIG. 5(*a*), graph G1 indicates one example of the relationship between the hypothetical vehicle length VL and the radius of curvature R1; and in FIG. 5(*b*), graph G2 indicates one example of the relationship between the hypothetical vehicle length VL and the radius of curvature R2. A horizontal axis in the figure represents the radius of curvature R1 (or the radius of curvature R2), and the vertical axis represents the hypothetical vehicle length VL.

As represented by graph G1 (or graph G2), when the radius of curvature R1 is larger than the threshold radius R1S (or when the radius of curvature R2 is larger than the threshold radius R2S), the condition changing section 15 will not change the hypothetical vehicle length VL (=the hypothetical vehicle length VL is configured to be the standard vehicle length L20), since the traveling direction determination section 14 determines that changing of the traveling direction of the own-vehicle VC1 is not in progress. On the other hand, when the radius of curvature R1 is equal to or smaller than the threshold radius R1S (or when the radius of curvature R2 is equal to or smaller than the threshold radius R2S), the traveling direction determination section 14 determines that changing of the traveling direction of the own-vehicle VC1 is in progress, and based on the formula (2) (or formula (3)), changes the hypothetical vehicle length VL of the forward vehicle VC2. More specifically, the hypothetical vehicle length VL of the forward vehicle VC2 is changed proportional to the radius of curvature R1 (or the radius of curvature R2).

The collision determination condition can be properly changed, since, as described above, the collision determination condition, which is a condition for the possibility determination section 16 to determine that there is a possibility of a collision, is changed, based on the radius of curvature R1 obtained by the radius-of-curvature calculation section 11 for the road on which the own-vehicle VC1 is positioned (or the radius of curvature R2 of the traveling trajectory PL2 of the forward vehicle VC2 obtained by the trajectory estimation section 13).

In addition, the collision determination condition can be properly changed by the condition changing section 15 so as to be strict with a simple method, since the collision determination condition, which is a condition for determining that there is a possibility of a collision, is changed by changing the hypothetical vehicle length VL of the forward vehicle VC2, based on the radius of curvature R1 obtained by the radius-of-curvature calculation section 11 for the road on which the own-vehicle VC1 is positioned (or the radius of curvature R2 of the traveling trajectory PL2 of the forward vehicle VC2 obtained by the trajectory estimation section 13).

Furthermore, the collision determination condition can be properly changed by the condition changing section 15 so as to be strict with a further simple method, since the collision determination condition, which is a condition for determining that there is a possibility of a collision, is changed by changing the hypothetical vehicle length VL of the forward vehicle VC2 in a manner proportional to the radius of curvature R1 obtained by the radius-of-curvature calculation section 11 for the road on which the own-vehicle VC1 is positioned (or the radius of curvature R2 of the traveling trajectory PL2 of the forward vehicle VC2 obtained by the trajectory estimation section 13).

In the present embodiment, although described is a case where the collision determination condition is changed by the condition changing section 15 based on the radius of curvature R1 of the road on which the own-vehicle VC1 is positioned, a configuration may be used in which the condition changing section 15 changes the collision determination condition based on other factors instead of (or, in addition to) the radius of curvature R1. For example, a configuration may be used in which the condition changing section 15 changes the collision determination condition based on a steering angle detected by a steering sensor or the like. In such a case, processes will be simplified.

In addition, in the present embodiment, although described is a case where the condition changing section 15 changes the collision determination condition by changing the hypothetical vehicle length VL of the forward vehicle VC2, a configuration may be used in which the condition changing section 15 changes the collision determination condition by other methods. For example, a configuration may be used in which the condition changing section 15 changes a hypothetical vehicle width of the forward vehicle VC2 instead of (or, in addition to) the hypothetical vehicle length VL of the forward vehicle VC2. Note that, descriptions related to changing the collision determination condition so as to be strict by reducing the hypothetical vehicle length VL will be provided in the following by using FIG. 4.

Furthermore, in the present embodiment, although described is a case where the condition changing section 15 changes the hypothetical vehicle length VL of the forward vehicle VC2 in a manner proportional to the radius of curvature R1, a configuration may be used in which the condition changing section 15 reduces the hypothetical vehicle length VL of the forward vehicle VC2 when the radius of curvature R1 is small. For example, a configuration may be used in which the condition changing section 15 more gradually reduces the hypothetical vehicle length VL of the forward vehicle VC2 when the radius of curvature R1 is smaller. In addition, for example, a configuration may be used in which the condition changing section 15 reduces the hypothetical vehicle length VL of the forward vehicle VC2 in accordance with a function of the preconfigured radius of curvature R1 (for example, a quadratic expression of the radius of curvature R1). In such a case, the collision determination condition can be further properly changed by properly configuring the function.

Returning to FIG. 1 again, the functional configuration of the collision determination ECU 1 will be described. The possibility determination section 16 is a functional section that determines whether or not there is a possibility of a collision with the forward vehicle VC2. Specifically, when the forward vehicle VC2 having preconfigured vehicle width VB and vehicle length VL moves on the traveling trajectory PL2 estimated by the trajectory estimation section 13, the possibility determination section 16 determines whether or not there is a possibility of a collision with the forward vehicle VC2 depending on whether or not the forward vehicle VC2 intersects the own-vehicle VC1.

FIG. 3(*b*) is a plain view showing one example of a process for the possibility determination section 16 to determine existence or non-existence of the possibility of a collision with the forward vehicle VC2. As shown in FIG. 3(*a*), the trajectory estimation section 13 estimates that the acquisition point of the forward vehicle VC2 will move in a sequence of acquisition points P1, P2, P3, and P4, corresponding to elapsing of time $\Delta T$, $2\times\Delta T$, $3\times\Delta T$, $4\times\Delta T$ (for example, time $\Delta T=0.1$ second) from the present time. Then, as shown in FIG. 3(*b*), the forward vehicle VC2 is estimated to reach a position of a forward vehicle C22, shown with broken lines, after elapsing of time ($2\times\Delta T$) from the present time, and to reach a position of a forward vehicle C24, shown with broken lines, after elapsing of time ($4\times\Delta T$) from the present time.

Note that, similar to the forward vehicle VC2, the forward vehicle C22 and the forward vehicle C24 have the vehicle width VB and the vehicle length VL. In addition, as shown in FIG. 3(*b*), the possibility determination section 16 determines that there is a possibility of a collision with the forward vehicle VC2, since the right side of the rear portion of the forward vehicle C24 intersects the right side of the front portion of the own-vehicle VC1.

As described above, whether or not there is a possibility of a collision can be precisely determined, since, when the forward vehicle VC2 having the preconfigured vehicle width VB and vehicle length VL moves on the traveling trajectory PL2 estimated by the trajectory estimation section 13, it is determined whether or not there is a possibility of a collision with the forward vehicle VC2 depending on whether or not the forward vehicle VC2 intersects the own-vehicle VC1.

In the present embodiment, although described is a case where the possibility determination section 16 determines whether or not there is a possibility of a collision with the forward vehicle VC2 based on the traveling trajectory PL2 estimated by the trajectory estimation section 13, a configuration may be used in which the possibility determination section 16 determines whether or not there is a possibility of a collision with the forward vehicle VC2 by using another method. For example, a configuration may be used in which the possibility determination section 16 determines whether or not there is a possibility of a collision with the forward vehicle VC2 depending on whether or not the forward vehicle VC2 intersects the own-vehicle VC1 at a timing when the acquisition point of the forward vehicle VC2 comes to a predetermined distance (for example, 5 m), which is configured in advance, or closer from the vehicle center of the own-vehicle VC1. In such a case, processes will be simplified.

Figure 4:
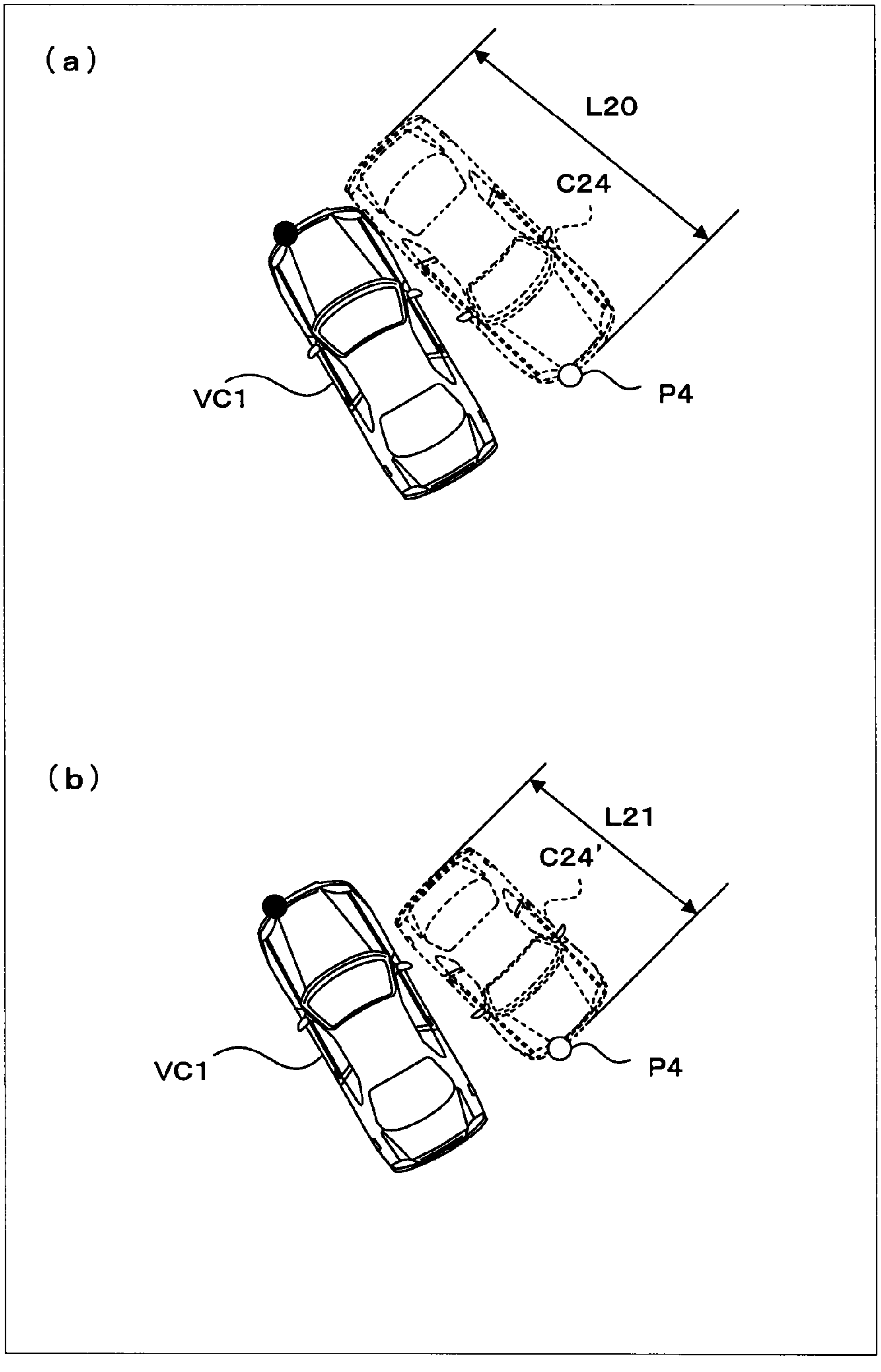
FIG. 4 is a plain view showing one example of an effect of having a condition changing section to reduce a hypothetical vehicle length VL of the forward vehicle VC2.

FIG. 4 is a plain view showing one example of an effect of having the condition changing section 15 reduce the hypothetical vehicle length VL of the forward vehicle VC2. FIG. 4(*a*) is a figure in which the own-vehicle VC1 and the forward vehicle C24 in FIG. 3(*b*) are enlarged. As described above by using FIG. 3(*b*), the possibility determination section 16 determines that there is a possibility of a collision with the forward vehicle VC2, since the right side of the rear portion of the forward vehicle C24 intersects the right side of the front portion of the own-vehicle VC1. The hypothetical vehicle length VL of the forward vehicle C24 is, for example, the standard vehicle length L20 (here, 4 m).

FIG. 4(*b*) is a plain view showing one example of a case where the condition changing section 15 reduces the hypothetical vehicle length VL of the forward vehicle VC2. Represented here is a case where the hypothetical vehicle length VL of the forward vehicle VC2 is changed to 3/5 (hypothetical vehicle length L21=2.4 m) of the standard vehicle length L20 by the condition changing section 15. In this case, as shown in FIG. 4(*b*), since the forward vehicle C24' is not intersecting the own-vehicle VC1, the possibility determination section 16 determines that there is no possibility of a collision with the forward vehicle VC2.

As described above, by having the hypothetical vehicle length VL to be changed from the standard vehicle length L20 (here, 4 m) to the hypothetical vehicle length L21 (=2.4 m), the situation, where the possibility determination section 16 has have determined that there is a possibility of a collision with the forward vehicle VC2, is then determined by the possibility determination section 16 as having no possibility of a collision with the forward vehicle VC2. Thus, by having the condition changing section 15 reduce the hypothetical vehicle length VL, the collision determination condition, which is a condition for determining that there is a possibility of a collision, is changed so as to be strict.

Figure 6:
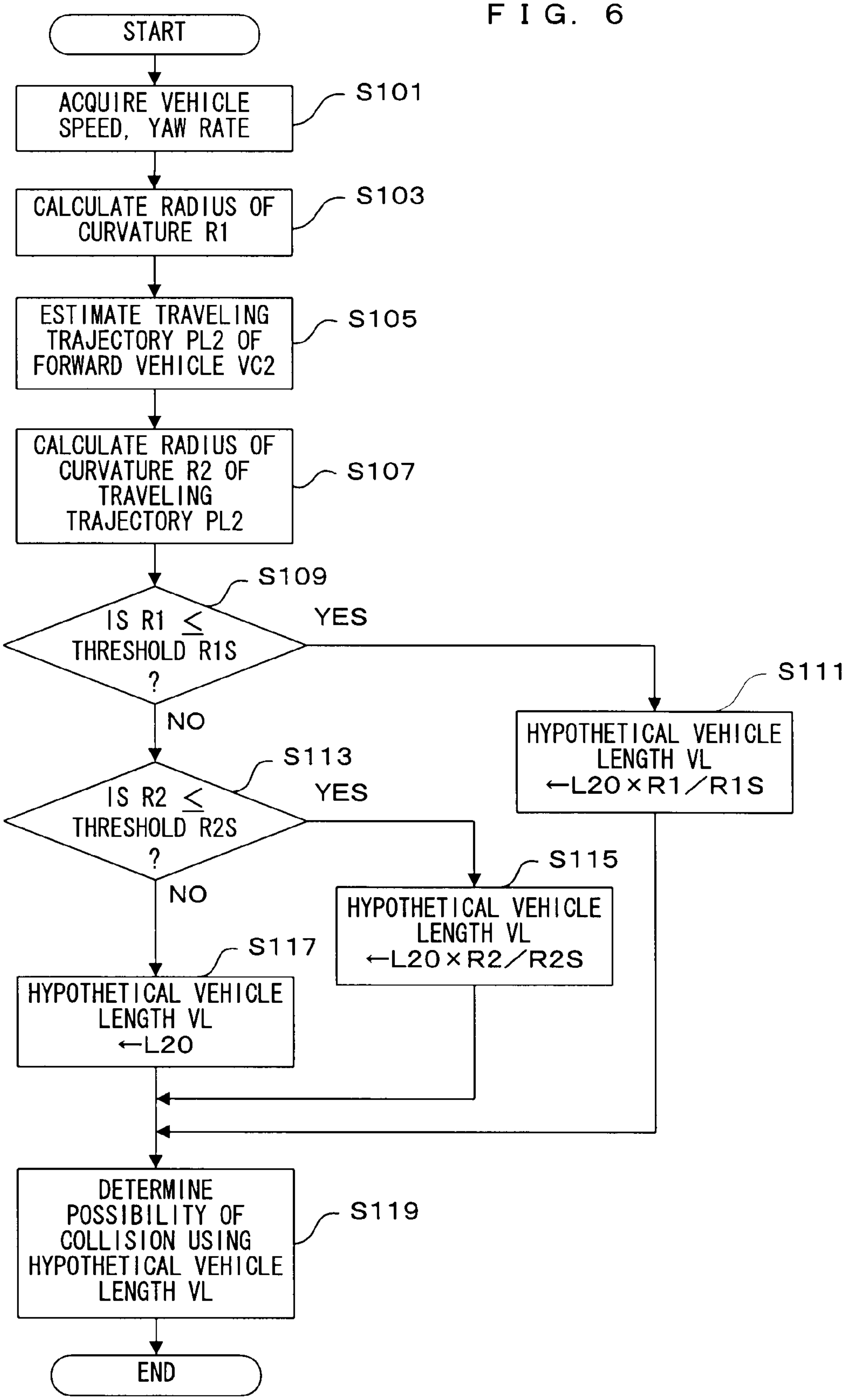
FIG. 6 is a flowchart showing one example of an operation of a collision determination ECU shown in FIG. 1.

FIG. 6 is a flowchart showing one example of an operation of the collision determination ECU 1 shown in FIG. 1. Note that, as a matter of convenience, described here is a case where the relative position and the relative velocity of the forward vehicle VC2 are detected by the object detection section 12. First, the vehicle speed V and the yaw rate α are acquired by the radius-of-curvature calculation section 11 (S101). Then, the radius of curvature R1 is obtained by the radius-of-curvature calculation section 11 by dividing the vehicle speed V acquired at step S101 with the yaw rate α (S103).

Next, the traveling trajectory PL2 is estimated by the trajectory estimation section 13 (S105). Next, the traveling direction determination section 14 calculates the radius of curvature R2 of the traveling trajectory PL2 obtained at step S105 (S107). Then, determination is conducted by the traveling direction determination section 14 for whether or not the radius of curvature R1 obtained at step S103 is equal to or smaller than the preconfigured threshold radius R1S (S109). If it is determined that the radius of curvature R1 is equal to or smaller than the preconfigured threshold radius R1S (YES at step S109), the traveling direction determination section 14 determines that changing of the traveling direction of the own-vehicle VC1 is in progress, and the hypothetical vehicle length VL of the forward vehicle VC2 is configured by the condition changing section 15 based on the following formula (4) (showing the above described formula (2) again) (S111); and the process is advanced to step S119.

$$\text{hypothetical vehicle length VL=standard vehicle length } L20\times R1/R1S \quad (4)$$

If it is determined that the radius of curvature R1 is not equal to or smaller than the preconfigured threshold radius R1S (larger than the threshold radius R1S) (NO at step S109), determination is conducted by the traveling direction determination section 14 for whether or not the radius of curvature R2 obtained at step S107 is equal to or smaller than the preconfigured threshold radius R2S (S113). If it is determined that the radius of curvature R2 is equal to or smaller than the preconfigured threshold radius R2S (YES at step S113), the traveling direction determination section 14 determines that changing of the traveling direction of the forward vehicle VC2 is in progress, and the hypothetical vehicle length VL of the forward vehicle VC2 is configured by the condition changing section 15 based on the following formula (5) (showing the above described formula (3) again) (S115); and the process is advanced to step S119.

$$\text{hypothetical vehicle length VL=standard vehicle length } L20\times R2/R2S \quad (5)$$

If it is determined that the radius of curvature R2 is not equal to or smaller than the preconfigured threshold radius R2S (larger than the threshold radius R2S) (NO at step S113), the traveling direction determination section 14 determines that changing of the traveling directions of both the own-vehicle VC1 and the forward vehicle VC2 are not in progress, and the hypothetical vehicle length VL of the forward vehicle VC2 is configured by the condition changing section 15 to be the standard vehicle length L20 (S117).

When the process at step S111 ends, or when the process at step S115 ends, or when the process at step S117 ends, the possibility determination section 16 determines whether or not there is a possibility of a collision with the forward vehicle VC2 by using the traveling trajectory PL2 obtained at step S105 and the hypothetical vehicle length VL configured at step S111, step S115, or step S117 (S119); and the process ends.

Figure 13:
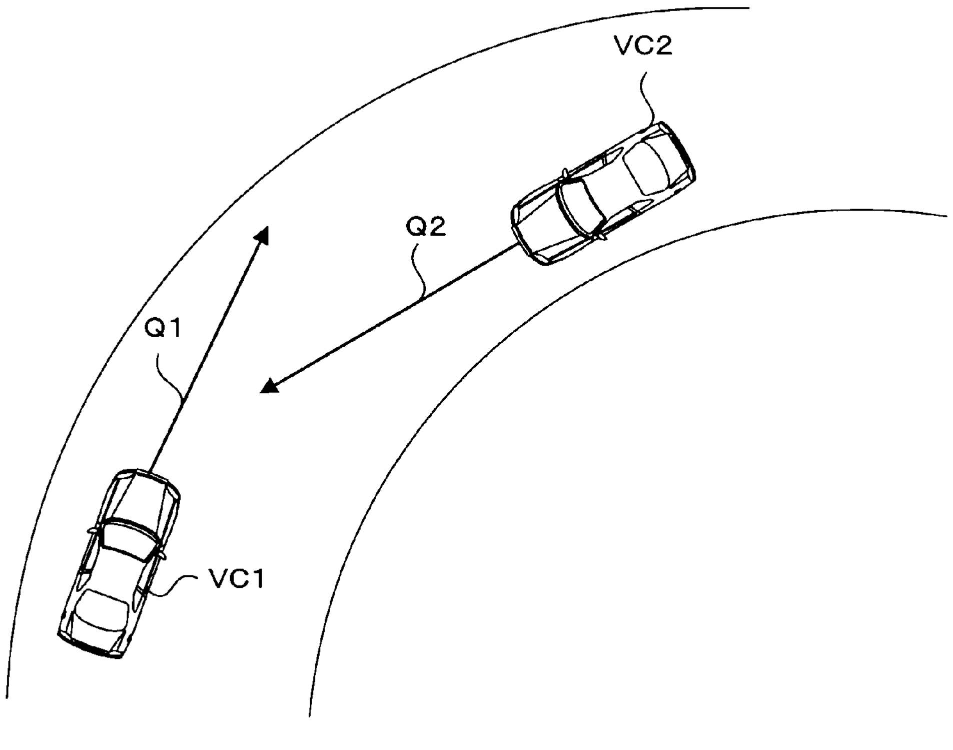
FIG. 13 is a plain view showing one example of moving direction vectors Q1, Q2 of an own-vehicle VC1 and an oncoming vehicle VC2 in a curved path.

When it is determined that changing of the traveling direction of the own-vehicle VC1 or the forward vehicle VC2 is in progress, the own-vehicle VC1 or the forward vehicle VC2 is estimated to be traveling in a curved path. Thus, in such a case, as described above by using FIG. 13, unnecessary operations of a passenger protection device and the like may be performed. However, since the collision determination condition, which is a condition for determining that there is a possibility of a collision, is changed so as to be strict (in this case, the hypothetical vehicle length VL of the forward vehicle VC2 is configured to be short), unnecessary operations of a passenger protection device and the like can be suppressed.

In the present embodiment, although described is a case where the condition changing section 15 changes the collision determination condition so as to be strict when the traveling direction determination section 14 determines that changing of the traveling direction of the own-vehicle VC1 or the forward vehicle VC2 is in progress, a configuration may be used in which the condition changing section 15 changes the collision determination condition so as to be strict when the traveling direction determination section 14 determines that changing of the traveling direction of at least one of the own-vehicle VC1 and the forward vehicle VC2 is in progress. For example, a configuration may be used in which the condition changing section 15 changes the collision determination condition so as to be strict when the traveling direction determination section 14 determines that changing of the traveling direction of the own-vehicle VC1 is in progress. In addition, for example, a configuration may be used in which the condition changing section 15 changes the collision determination condition so as to be strict when the traveling direction determination section 14 determines that changing of the traveling directions of the own-vehicle VC1 and the forward vehicle VC2 are in progress.

Here, one detailed example of a collision determination method conducted by the collision determination device according to the present invention will be described. The collision determination method shown in the following can be executed on the collision determination ECU 1. Note that, the collision determination method according to the present invention is not limited by the following example.

Figure 7:
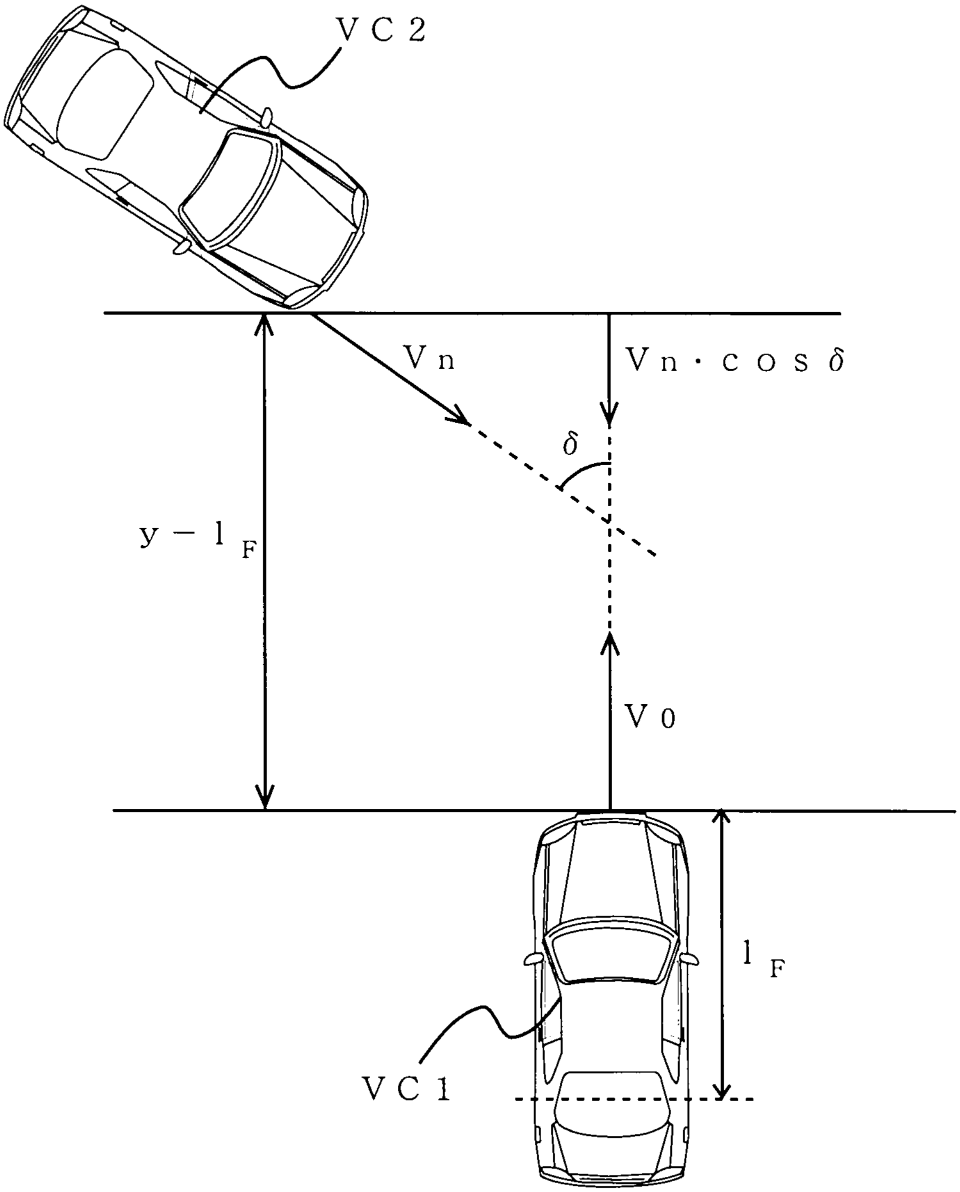
FIG. 7 is a figure showing a method for calculating a time TTC to a collision.

First, assuming that the own-vehicle VC1 and the forward vehicle VC2 are to collide, a time TTC (Time To Collision) to the collision is calculated. FIG. 7 is a figure showing the method for calculating the time TTC to the collision.

When the forward vehicle VC2 is approaching the own-vehicle VC1 from a diagonal direction, the time TTC to the collision can be obtained based on the following formula (6).

$$TTC=(y-l_F)/(V_n \cdot \cos\delta+V_0) \quad (6)$$

Here, the characters respectively represent the following meanings.

y: Y coordinate of the acquisition point of the forward vehicle VC2 when the center of the rear wheel axle of the own-vehicle VC1 is the point of origin (the front to rear direction of the own-vehicle VC1 is defined as a Y-axis, and the right-to-left direction of the own-vehicle VC1 is defined as an X-axis); $l_F$: length from the center of the tip portion of the own-vehicle VC1 to the center of the rear wheel axle; $V_n$: velocity of the forward vehicle VC2; δ: angle between the traveling direction of the forward vehicle VC2 and the traveling direction of the own-vehicle VC1; $V_0$: velocity of the own-vehicle VC1

The radar sensors 23 periodically calculates the relative position (position of the acquisition point) and the relative velocity (velocity of the acquisition point) of the forward vehicle VC2, and calculates a traveling direction vector based on relative positions and relative velocities of multiple past periods (for example, past ten periods). For the calculation of the traveling direction vector, for example, the least squares method can be used. $V_n$ is the size of the calculated traveling direction vector.

Figure 8:
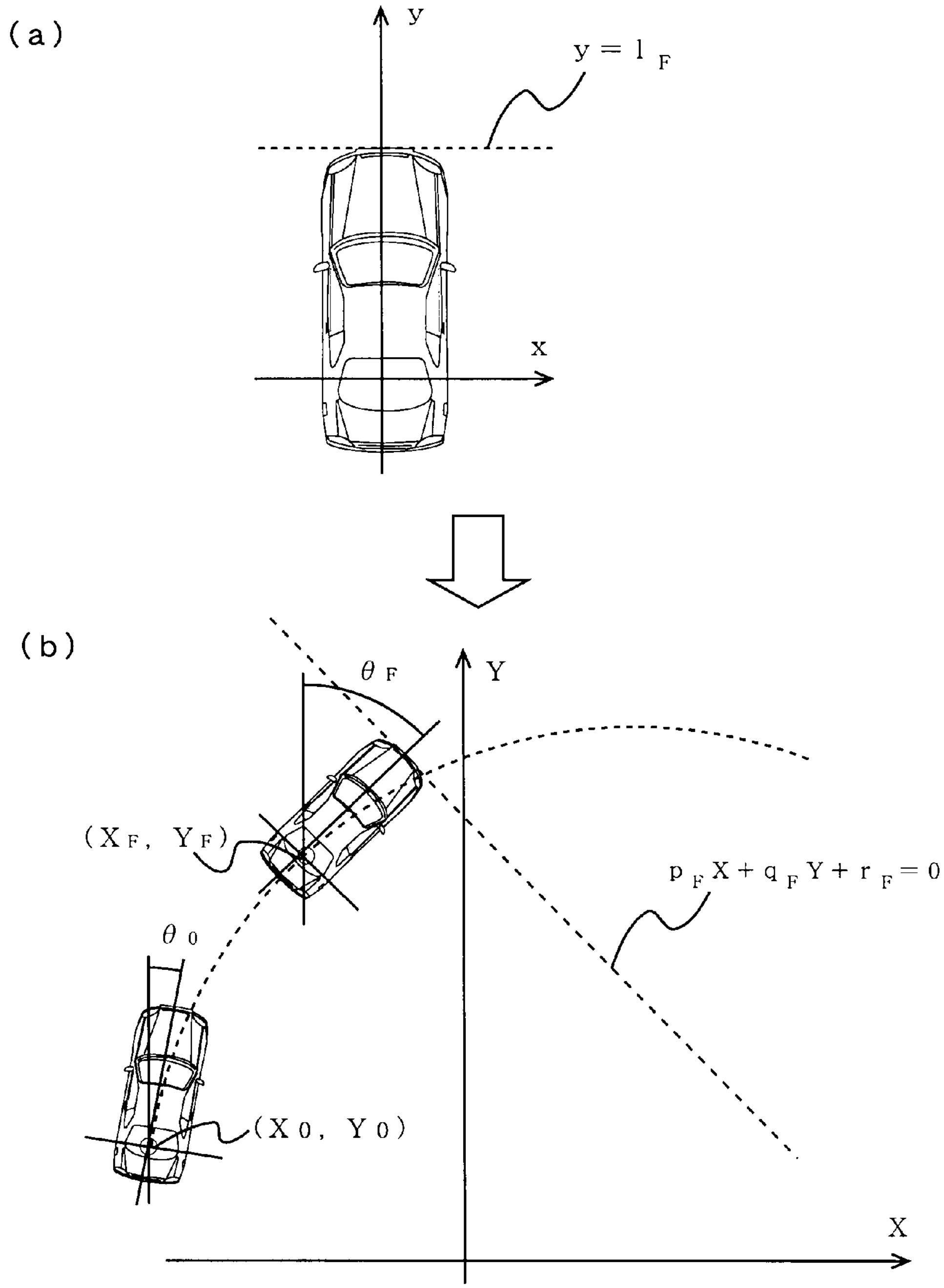
FIG. 8 is a figure for describing a method for calculating a predicted own-vehicle position after the time TTC; (A) is a figure showing a coordinate system in which the point of origin is the center of a rear wheel axle of the own-vehicle; and (B) is a figure showing a coordinate system in which the point of origin is fixed on the ground.

Next, assuming that the own-vehicle VC1 is turning, a predicted own-vehicle position after the time TTC is calculated. FIG. 8 is a figure for describing the method for calculating the predicted own-vehicle position after the time TTC.

A predicted deflection angle $\theta_F$ and the predicted own-vehicle position ($X_F$, $Y_F$) of the own-vehicle VC1 can be obtained from the following formulae (7), (8), and (9).

$$\theta_F=\theta_0+V_0 \cdot TTC/(-R) \quad (7)$$

$$X_F=X_0+V_0 \cdot TTC \cdot \sin(-\theta_F) \quad (8)$$

$$Y_F=Y_0+V_0 \cdot TTC \cdot \cos(-\theta_F) \quad (9)$$

Here, the characters respectively represent the following meanings.

$\theta_0$: deflection angle at the current position of the own-vehicle VC1; $V_0$: velocity of the own-vehicle VC1; R: turning radius of the traveling trajectory of the own-vehicle VC1; $X_0$: X coordinate of the current position of the own-vehicle VC1; $Y_0$: Y coordinate of the current position of the own-vehicle VC1

Next, a formula representing a frontal extension line from the own-vehicle VC1 when reaching the predicted own-vehicle position of the own-vehicle VC1 is obtained, based on information regarding the calculated predicted own-vehicle position. The frontal extension line $y=l_F$, which is in a coordinate system having the center of the rear wheel axle of the own-vehicle VC1 as a point of origin (refer to FIG. 8(A)), is converted to formula (10) of a coordinate system in which the point of origin is fixed to the ground (refer to FIG. 8(B)).

$$p_F X+q_F Y+r_F=0 \quad (10)$$

When performing the above, in order to prevent overflowing of digits, cases are classified for the range of $\theta_F$ as shown in formulae (11) to (13) and formulae (14) to (16).

(case of $\pi/4 < |\theta_F| \leqq 3\pi/4$)

$$p_F=1 \quad (11)$$

$$q_F=\cos(-\theta_F)/\sin(-\theta_F) \quad (12)$$

$$r_F=(-l_F-X_F\sin(-\theta_F)-Y_F\cos(-\theta_F))/\sin(-\theta_F) \quad (13)$$

(case of $3\pi/4 < |\theta_F| \leqq \pi$)

$$p_F=\sin(-\theta_F)/\cos(-\theta_F) \quad (14)$$

$$q_F=1 \quad (15)$$

$$r_F=(-l_F-X_F\sin(-\theta_F)-Y_F\cos(-\theta_F))/\cos(-\theta_F) \quad (16)$$

Next, trajectory prediction line $p_nX+q_nY+r_n=0$ of the forward vehicle VC2 is obtained. Each coefficient in $p_nX+q_nY+r_n=0$ can be obtained based on past history of acquisition points of the forward vehicle VC2. For example, the traveling direction vector is obtained by applying the least squares method to multiple past acquisition points, and a straight line obtained by extending the vector can be used as the trajectory prediction line.

Figure 9:
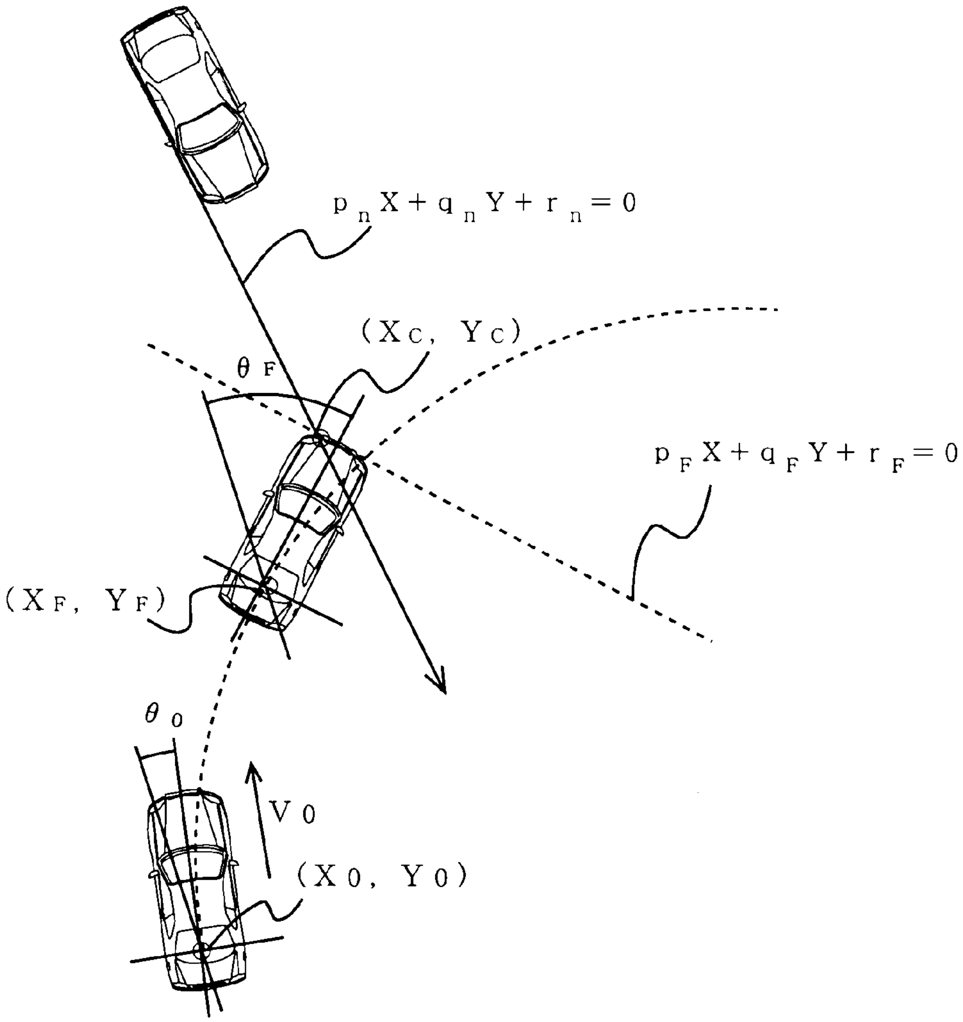
FIG. 9 is a figure showing a method for calculating a predicted collision point.

Next, an intersection point of the straight line $p_F X+q_F Y+r_F=0$ of formula (10) and the trajectory prediction line $p_nX+q_nY+r_n=0$ of the forward vehicle VC2 is obtained. This intersection point is a predicted collision point of the own-vehicle VC1 and the forward vehicle VC2. Coordinates ($X_c$, $Y_c$) of the predicted collision point is represented by the following formulae (17) to (20). FIG. 9 is a figure showing the predicted collision point. Note that, coordinates ($X_c$, $Y_c$) are coordinates in a coordinate system in which the point of origin is fixed to the ground (ground coordinate system).

(case of $\pi/4<|\theta_F|\leqq 3\pi/4$)

$$X_C=-q_F Y_C/p_F-r_F/p_F \quad (17)$$

$$Y_C=(p_n r_F-p_F r_n)/(p_F q_n-p_n q_F) \quad (18)$$

(case of $0\leqq|\theta_F|\leqq\pi/4$ or $3\pi/4<|\theta_F|\leqq\pi$)

$$X_C=(q_F r_n-q_n r_F)/(p_F q_n-p_n q_F) \quad (19)$$

$$Y_C=-p_F X_C/q_F-r_F/p_{Ftm} \quad (20)$$

When $p_F q_n-p_n q_F=0$ is satisfied, these straight lines are parallel to each other, and since an intersection point does not exist, it will be determined that there is no possibility of a collision.

Figure 10:
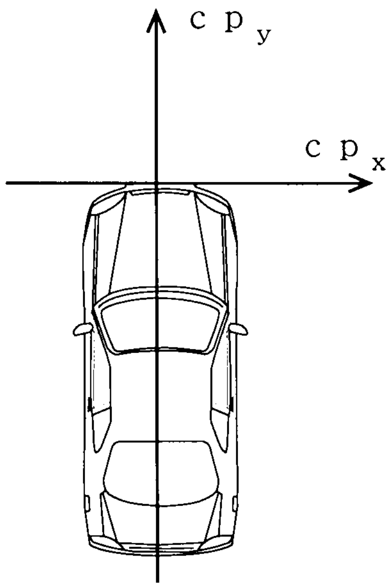
FIG. 10 is a figure showing a cp coordinate system.

In a coordinate system (cp coordinate system; refer to FIG. 10) in which the point of origin is the center of the front end portion of the own-vehicle VC1, the front to rear direction of the own-vehicle VC1 is the Y axial direction, and the width direction of the own-vehicle VC1 is the X axial direction; the predicted collision point ($cp_x$, $cp_y$) is represented by the following formulae (21) and (22).

$$cp_x=\cos(-\theta_F)\,(X_C-X_F)-\sin(-\theta_F)\,(Y_C-Y_F) \quad (21)$$

$$cp_y=0 \quad (22)$$

The predicted collision point ($cp_x$, $cp_y$) can be calculated by assigning, to formula (21), the values calculated in formulae (7), (8), (9), (17), (18), (19), and (20).

Here, since $cp_x$ does not take into consideration of a size of the forward vehicle VC2, it is corrected to be a formula that takes into consideration of the size.

The corrected $cp_x'$ is represented by formulae (23) and (24).

Figure 11:
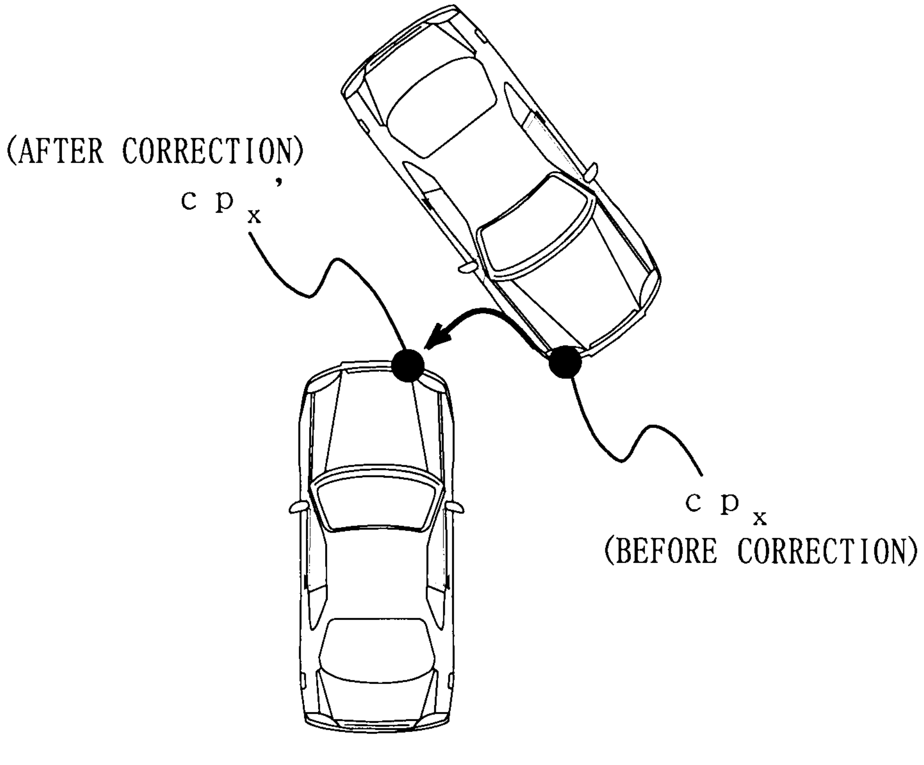
FIG. 11 is a figure showing a manner in which cp coordinates are corrected as cp' coordinates in order to take into consideration of the size of the forward vehicle VC2.

(Case in which the forward vehicle VC2 is approaching from "diagonal front left"; refer to FIG. 11)

$$cp_x'=cp_x-d_{m\epsilon}\cdot\sigma\cdot\sigma_R \quad (23)$$

(Case in which the forward vehicle VC2 is approaching from "diagonal front right")

$$cp_x'=cp_x+d_{m\epsilon}\cdot\sigma\cdot\sigma_R \quad (24)$$

Here, the characters respectively represent the following meanings.

$$dm\epsilon=lm\cdot\sin\epsilon \quad (25)$$

Figure 12:
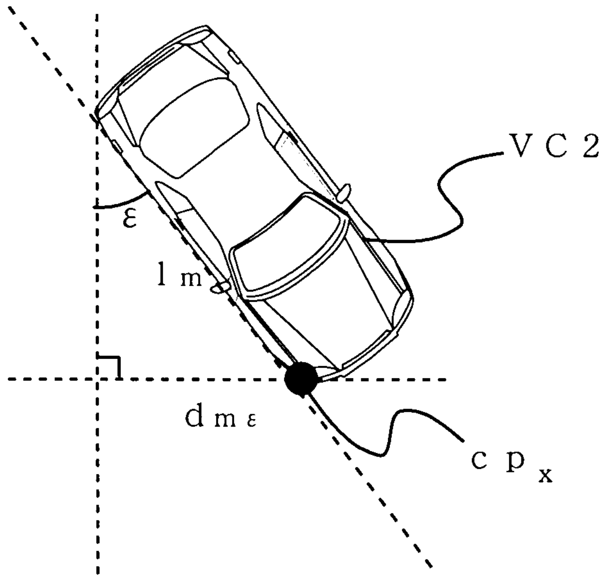
FIG. 12 is a figure showing an angle between a front to rear direction of the own-vehicle and an approaching direction of the forward vehicle.

$\epsilon$: angle between the front to rear direction of the own-vehicle VC1 and an approaching direction of the forward vehicle VC2 (refer to FIG. 12)

$l_m$: length of the forward vehicle VC2 (corresponding to the standard vehicle length described above)

(Case in which the forward vehicle VC2 is approaching form "diagonal front left")

$$\sigma=cp_x/(d_R+d_{m\epsilon}\cdot\sigma_R) \quad (26)$$

(Case in which the forward vehicle VC2 is approaching from "diagonal front right")

$$\sigma=-cp_x/(d_R+d_{m\epsilon}\cdot\sigma_R) \quad (27)$$

$$\sigma_R=|R|/|R_{TH}|\,(0\leqq\sigma_R\leqq 1) \quad (28)$$

Here, |R|: absolute value of the radius of curvature of the road (since R is represented by a positive value in a right curve and a negative value in a left curve); $|R_{TH}|$: an upper limit value of |R| when conducting a correction of $\sigma$ (for example, 100 m).

According to formula (28), the smaller the absolute value |R| of the radius of curvature of the road is, $\sigma_R$ becomes smaller. This section, the smaller the absolute value |R| of the radius of curvature of the road is, a smaller correction coefficient $\sigma_R$ is multiplied to the length $l_m$ of the forward vehicle VC2 indicated in formula (25). $l_m\cdot\sigma_R$ corresponds to the hypothetical vehicle length described above. This section, the length of the forward vehicle VC2 is corrected to a small value depending on the radius of curvature of the curve, and this represents a characteristic of the invention of the present application.

If $cp_x'$ calculated by formulae (23) and (24) is smaller than half $d_R$ of the width of the own-vehicle VC1, it is determined that the own-vehicle VC1 and the forward vehicle VC2 will collide.

On the other hand, if $cp_x'$ is equal to or larger than half $d_R$ of the width of the own-vehicle VC1, it is determined that the own-vehicle VC1 and the forward vehicle VC2 will not collide.

The above described collision determination is conducted in every acquisition point calculation period of the radar sensors 23. When a period in which a determination is made that a collision will take place continues for a predetermined number of times, or when a proportion of the period in which a determination is made that a collision will take place becomes a predetermined proportion or larger, safety measures such as brake assistance, sounding of an alarm sound, and the like are executed.

Note that, the collision determination device according to the present invention is not limited to the collision determination ECU 1 according to the above described embodiment, and the following configurations may also be used.

(A) In the present embodiment, although described is a case where the collision determination ECU 1 functionally includes the radius-of-curvature calculation section 11, the object detection section 12, the trajectory estimation section 13, the traveling direction determination section 14, the condition changing section 15, the possibility determination section 16, and the like; a configuration may be used in which any one of the functional sections of the radius-of-curvature calculation section 11, the object detection section 12, the trajectory estimation section 13, the traveling direction determination section 14, the condition changing section 15, and the possibility determination section 16 are formed from a hardware such as an electric circuit or the like.

(B) In the present embodiment, although described is a case where the collision determination device consists of the collision determination ECU 1, a configuration may be used in which the collision determination device is integrally configured with one part of a sensor or the like. For example, a configuration may be used in which the collision determination device is integrally configured with the radar sensors 23 (for example, a configuration in which a control device that conducts signal processing of the radar sensors 23 is integrated thereto).

(C) In the present embodiment, although described is a case where the condition changing section 15 changes the hypothetical vehicle length VL of the forward vehicle VC2 in a manner proportional to the radius of curvature R1, a configuration may be used in which the condition changing section 15 changes the hypothetical vehicle length VL of the forward vehicle VC2 based on the size of the forward vehicle VC2. For example, a configuration in which the condition changing section 15 changes the hypothetical vehicle length VL based on the following formula (6) may be used.

$$\text{hypothetical vehicle length VL}=\gamma\times\text{detected vehicle length } L200\times R1/R1S \quad (6)$$

Here, the coefficient γ is a coefficient configured based on the size of the forward vehicle VC2, and the detected vehicle length L200 is the vehicle length of the forward vehicle VC2 estimated from the numbers, positions, and the like of the acquisition points obtained by the radar sensors 23.

In addition, when the detected vehicle length L200 is large, (=when the forward vehicle VC2 is a large-size car), the coefficient γ is preferably configured as a value smaller than "1" (for example, 0.8), and when the detected vehicle length L200 is small (=when the forward vehicle VC2 is a small-size car), the coefficient γ is preferably configured as a value larger than "1" (for example, 1.2). As a result, when the forward vehicle VC2 is a large-size car, an amount of change of the hypothetical vehicle length VL based on the radius of curvature R1 becomes large, and unnecessary operations of a passenger protection device and the like can be further effectively suppressed.

(D) In the present embodiment, although a case where the condition changing section 15 changes the hypothetical vehicle length VL of the forward vehicle VC2 is described, a configuration in which the condition changing section 15 changes the collision determination condition so as to be strict with another method may be used. More specifically, the possibility determination section 16 may setup, as appropriate, a method in which the condition changing section 15 changes the collision determination condition so as to be strict, depending on a method for determining whether or not there is a possibility of a collision.

For example, described here is a case where the possibility determination section 16 determines whether or not there is a possibility of a collision based on whether or not a direction corresponding to the traveling direction vector of the forward vehicle VC2 after elapsing of a predetermined time is in a preconfigured range (referred next as a "direction determination range"). In such a case, the condition changing section 15 may change the collision determination condition so as to be strict by narrowing the "direction determination range".

Industrial Applicability

The present invention can be applied in a collision determination device which is, for example, mounted on a vehicle and determines existence or non-existence of the possibility of a collision with another vehicle.

The invention claimed is:

1. A collision determination device which is mounted on a vehicle and determines existence or non-existence of a possibility of a collision with another vehicle, the collision determination device comprising:

a trajectory estimating section that estimates a traveling trajectory which is a trajectory to be traveled in the future by a representation point of the another vehicle;

a possibility determination section that determines whether or not there is a possibility of a collision with the another vehicle depending on whether or not the another vehicle intersects an own-vehicle, when the another vehicle having preconfigured vehicle width and vehicle length moves on the traveling trajectory estimated by the trajectory estimating section;

a traveling direction determination section that determines whether or not at least one of the own-vehicle and the another vehicle is traveling in a curved path; and a condition changing section that changes a collision determination condition, which is a condition for the possibility determination section to determine that there is a possibility of a collision, so as to be strict, by reducing at least one of a vehicle width and a vehicle length of the another vehicle when the traveling direction determination section determines that traveling in a curved path is in progress.

2. The collision determination device according to claim 1, comprising an object detection section that detects a position of the another vehicle via a radar; wherein the representation point of the another vehicle is an acquisition point obtained by having the another vehicle acquired by the radar.

3. The collision determination device according to claim 1, comprising a radius-of-curvature calculation section that obtains a radius of curvature of a road on which the own-vehicle is positioned; wherein the traveling direction determination section determines whether or not the own-vehicle is traveling in a curved path, based on the radius of curvature obtained by the radius-of-curvature calculation section.

4. The collision determination device according to claim 3, wherein the traveling direction determination section determines that the own-vehicle is traveling in a curved path, when the radius of curvature obtained by the radius-of-curvature calculation section is equal to or smaller than a preconfigured threshold radius.

5. The collision determination device according to claim 3, wherein the radius-of-curvature calculation section obtains the radius of curvature by dividing a vehicle speed with a yaw rate.

6. The collision determination device according to claim 1, comprising a radius-of-curvature calculation section that obtains a radius of curvature of a road on which the own-vehicle is positioned; wherein the condition changing section changes the collision determination condition, based on the radius of curvature obtained by the radius-of-curvature calculation section.

7. The collision determination device according to claim 6, wherein the radius-of-curvature calculation section obtains the radius of curvature by dividing a vehicle speed with a yaw rate.

8. The collision determination device according to claim 1, wherein the traveling direction determination section determines whether or not the another vehicle is traveling in a curved path, based on a past traveling trajectory of the another vehicle.

9. A collision determination device which is mounted on a vehicle and determines existence or non-existence of a possibility of a collision with another vehicle, the collision determination device comprising:

a trajectory estimating section that estimates a traveling trajectory which is a trajectory to be traveled in the future by a representation point of the another vehicle;

a possibility determination section that determines whether or not there is a possibility of a collision with the another vehicle depending on whether or not the another vehicle intersects an own-vehicle, when the another vehicle having preconfigured vehicle width and vehicle length moves on the traveling trajectory estimated by the trajectory estimating section;

a traveling direction determination section that determines whether or not at least one of the own-vehicle and the another vehicle is traveling in a curved path;

a radius-of-curvature calculation section that obtains a radius of curvature of a road on which the own-vehicle is positioned; and a condition changing section that changes a collision determination condition, which is a condition for the possibility determination section to determine that there is a possibility of a collision, so as to be strict, by changing at least one of a vehicle width and a vehicle length of the another vehicle, based on the radius of curvature obtained by the radius-of-curvature calculation section when the traveling direction determination section determines that traveling in a curved path is in progress.

10. The collision determination device according to claim 9, wherein the condition changing section changes the collision determination condition by changing the vehicle length of the another vehicle in a manner approximately proportional to the radius of curvature obtained by the radius-of-curvature calculation section.

* * * * *